(12) United States Patent
Dohan, II et al.

(10) Patent No.: US 12,073,076 B1
(45) Date of Patent: Aug. 27, 2024

(54) GESTURAL NAVIGATION OF A GRAPHICAL USER INTERFACE

(71) Applicant: Capital One Services, LLC, McLean, VA (US)

(72) Inventors: Thomas Dohan, II, Elmhurst, IL (US); Xiang Lan, South Orange, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/342,380

(22) Filed: Jun. 27, 2023

(51) Int. Cl.
*G06F 3/04883* (2022.01)
*G06F 3/0483* (2013.01)

(52) U.S. Cl.
CPC ........ *G06F 3/04883* (2013.01); *G06F 3/0483* (2013.01)

(58) Field of Classification Search
CPC ............................ G06F 3/04883; G06F 3/0483
See application file for complete search history.

(56) References Cited

U.S. PATENT DOCUMENTS

| | | | |
|---|---|---|---|
| 10,635,266 B2 * | 4/2020 | Satterfield | G06F 3/0481 |
| 10,635,299 B2 * | 4/2020 | Peterson | G06F 3/0486 |
| 10,712,934 B2 * | 7/2020 | Lemay | H04M 1/72403 |
| 10,942,633 B2 * | 3/2021 | Faulkner | G06F 3/04883 |
| 10,976,924 B2 * | 4/2021 | Gan | G06F 3/0482 |
| 11,385,785 B2 * | 7/2022 | Rogers | G06F 3/0488 |
| 11,636,460 B2 * | 4/2023 | Sun | G06Q 20/227 705/39 |
| 11,797,164 B2 * | 10/2023 | Rogers | G06F 3/04817 |
| 11,829,581 B2 * | 11/2023 | Song | G06F 3/0486 |
| 11,907,516 B2 * | 2/2024 | Seo | G06F 1/1624 |
| 11,947,782 B2 * | 4/2024 | Missig | G06F 3/04886 |
| 2016/0179798 A1 * | 6/2016 | Franks | G06F 3/0482 715/739 |
| 2021/0209578 A1 * | 7/2021 | Sun | G06F 3/04883 |

* cited by examiner

*Primary Examiner* — Vinh T Lam
(74) *Attorney, Agent, or Firm* — Harrity & Harrity, LLP

(57) ABSTRACT

In some implementations, a device may provide, for display via a display screen, a graphical user interface (GUI) that includes a first page and one or more sheets corresponding to respective secondary pages, wherein the one or more sheets include respective sets of one or more display elements from respective sets of display elements associated with the respective secondary pages. The device may detect a first gestural interaction in an area of the display screen that is associated with a portion of the GUI, the first gestural interaction indicating an action. The device may update, based on detecting the first gestural interaction and the action, the GUI to cause one or more other portions, from the first page and the one or more sheets, of the GUI to display updated information in accordance with the action. The device may provide, for display, the GUI indicating the updated information.

20 Claims, 7 Drawing Sheets

US 12,073,076 B1

GESTURAL NAVIGATION OF A GRAPHICAL USER INTERFACE

BACKGROUND

A graphical user interface is a form of user interface that allows users to interact with electronic devices. A device may provide a graphical user interface (GUI) that presents one or more pages. A user may navigate to a page by interacting with the GUI. Navigation to a page may consume resources of the device, may consume resources of a server that serves the page to the device, and/or may consume network resources used for communications between the device and the server.

SUMMARY

Some implementations described herein relate to a system for gestural navigation of a graphical user interface (GUI). The system may include one or more memories and one or more processors communicatively coupled to the one or more memories. The one or more processors may be configured to provide, for display via a display screen, the GUI, wherein the GUI includes a core page and one or more sheets corresponding to respective secondary pages, wherein the one or more sheets include respective subsets of display elements from respective sets of display elements associated with the respective secondary pages, and wherein the respective subsets of display elements display filtered information from a data set associated with at least one of the core page or the respective secondary pages. The one or more processors may be configured to detect a first gestural interaction in an area of the display screen that is associated with a portion of the GUI, wherein the portion of the GUI is the core page or a sheet from the one or more sheets, and wherein the first gestural interaction indicates an action associated with the GUI. The one or more processors may be configured to update, based on detecting the first gestural interaction and the action, the GUI to cause all other portions, from the core page and the one or more sheets, of the GUI to display updated information in accordance with the action. The one or more processors may be configured to provide, for display via the display screen, the GUI indicating the updated information based on updating the GUI.

Some implementations described herein relate to a method of gestural navigation of a GUI. The method may include providing, by a device and for display via a display screen, the GUI, wherein the GUI includes a first page and one or more sheets corresponding to respective secondary pages, wherein the one or more sheets include respective sets of one or more dynamic display elements from respective sets of display elements associated with the respective secondary pages, and wherein the first page is displayed in a first layer of the GUI and the one or more sheets are displayed in a second layer of the GUI. The method may include detecting, by the device, a first gestural interaction in an area of the display screen that is associated with a portion of the GUI, wherein the portion of the GUI is the first page or a sheet from the one or more sheets, and wherein the first gestural interaction indicates an action. The method may include updating, by the device and based on detecting the first gestural interaction and the action, the GUI to cause one or more other portions, from the first page and the one or more sheets, of the GUI to display updated information in accordance with the action. The method may include providing, by the device and for display via the display screen, the GUI indicating the updated information based on updating the GUI.

Some implementations described herein relate to a non-transitory computer-readable medium that stores a set of instructions. The set of instructions, when executed by one or more processors of a device, may cause the device to provide, for display via a display screen, a GUI, wherein the GUI includes a core page and one or more sheets corresponding to respective secondary pages, wherein the one or more sheets include respective subsets of display elements from respective sets of display elements associated with the respective secondary pages, and wherein the respective subsets of display elements display filtered information from a data set associated with at least one of the core page or the respective secondary pages. The set of instructions, when executed by one or more processors of the device, may cause the device to detect a first gestural interaction in an area of the display screen that is associated with a portion of the GUI, wherein the portion of the GUI is the core page or a sheet from the one or more sheets, and wherein the first gestural interaction indicates an action associated with the GUI. The set of instructions, when executed by one or more processors of the device, may cause the device to update, based on detecting the first gestural interaction and the action, the GUI to cause all other portions, from the core page and the one or more sheets, of the GUI to display updated information in accordance with the action. The set of instructions, when executed by one or more processors of the device, may cause the device to provide, for display via the display screen, the GUI indicating the updated information based on updating the GUI.

DETAILED DESCRIPTION

Figure 1A:
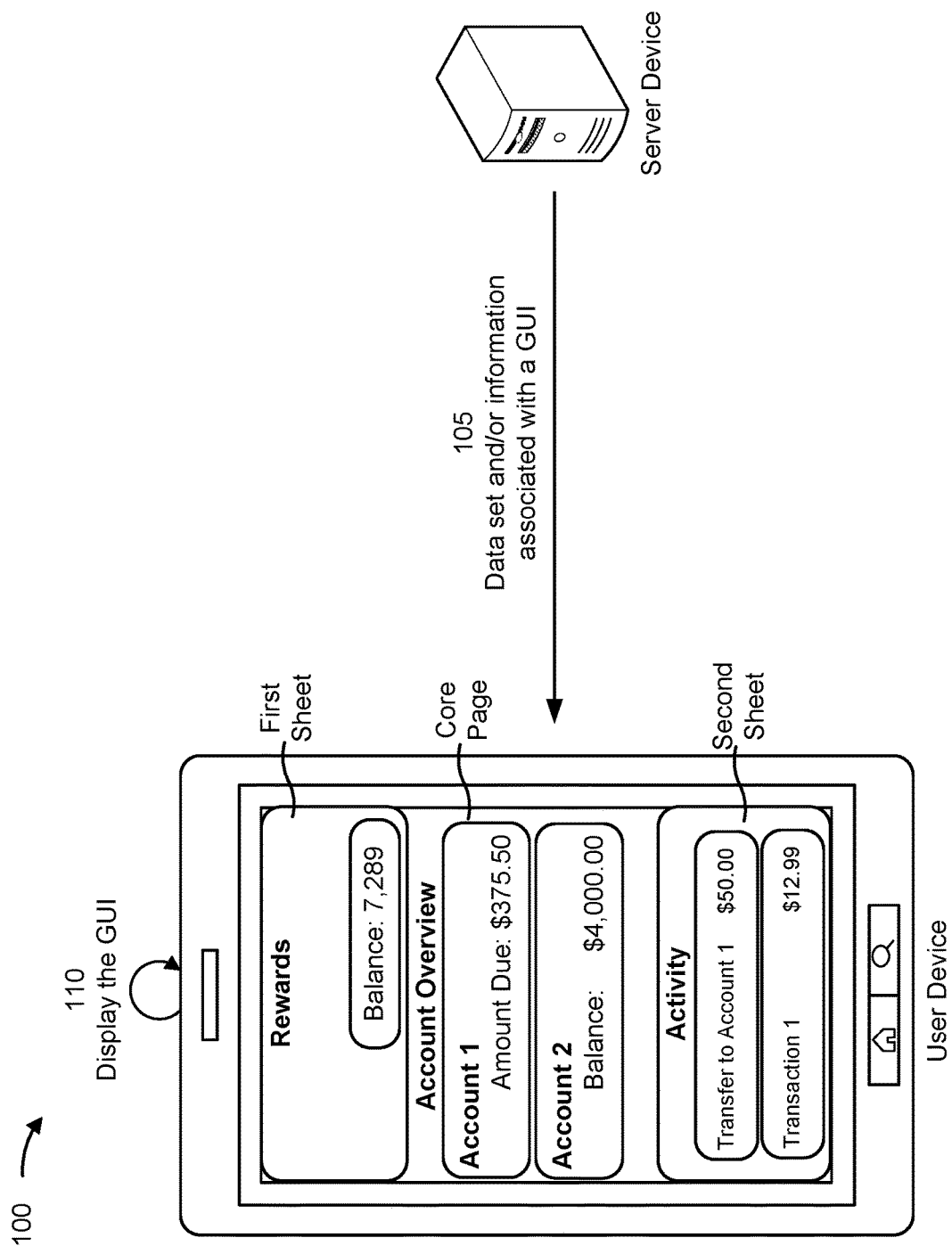
FIGS. 1A-1D are diagrams of an example associated with gestural navigation of a graphical user interface (GUI), in accordance with some embodiments of the present disclosure.

The following detailed description of example implementations refers to the accompanying drawings. The same reference numbers in different drawings may identify the same or similar elements.

A user interface, such as a graphical user interface (GUI) provided by an application executing on a user device, may include one or more pages for presentation via the user device. In some cases, a user may navigate between pages and/or display elements of the GUI using gestural navigation. "Gestural navigation" of a GUI refers to the use of physical gestures, such as swipes, pinches, taps, and/or other hand movements, to interact with the user device or the application. Gestural navigation has become increasingly common with the widespread adoption of touchscreen devices, such as smartphones and tablets. For example, rather than using typical input devices, such as keyboards, mice, and/or buttons, gestural navigation enables the user to control the GUI and access various functions and features by performing specific gestures on a touch-sensitive screen. For example, the user may swipe left or right to navigate between screens, pinch to zoom in or out of an image, and/or tap with multiple fingers to access a menu or shortcut, among other examples. Gestural navigation can provide a more intuitive and efficient way for the user to interact with the user device and/or the GUI because the gestural navigation more closely mimics natural physical movements and gestures.

The GUI may include multiple pages and/or multiple display elements associated with providing information to the user. A page may include links and/or display elements associated with navigating to other pages. For example, a home page, or a main page, may include links to multiple sub-pages or secondary pages. Often, it may be difficult for a user to locate, via the home page, particular information of interest that is included in a secondary page. For example, the GUI may include a tab bar that includes multiple tabs. A user may navigate to a secondary page by selecting or interacting with a tab. However, a description of the tab on the home page may be unintuitive and/or the user may need to navigate through links in multiple hierarchical levels of secondary pages in order to locate the information of interest. For example, the user may navigate to a secondary page to identify content included in the secondary page.

Navigating through a large number of pages to find relevant information creates a poor user experience, consumes computing resources (e.g., processing resources and memory resources) that are needed for the user device to generate and display the page(s) and that are needed for one or more server devices to serve the page(s) to the user device, and/or consumes excessive network resources that are needed for communications between the user device and a server device (e.g., a server device that supports the application). Additionally, the links or tabs on a home page (e.g., associated with navigating to a secondary page) may not include indications of the actual content included in the secondary page. For example, if the content or information included in the secondary page changes, the user may not be able to identify that the change has occurred and/or what the change is from the home page. The user may navigate to each secondary page to identify that the change has occurred and/or what the change is. This consumes computing resources (e.g., processing resources and memory resources) that are needed for the user device to generate and display the page(s) and that are needed for one or more server devices to serve the page(s) to the user device, and/or consumes excessive network resources that are needed for communications between the user device and a server device.

Some implementations described herein enable improved gestural navigation of a GUI. For example, the GUI may include a core page (e.g., a main page or a home page). The main page may include one or more display elements for displaying information associated with the main page. The core page may include one or more sheets (or layers). The one or more sheets may correspond to respective secondary pages of the GUI. Each sheet may include one or more display elements. The one or more display elements for a given sheet may be a subset of display elements from a set of display elements of a secondary page corresponding to the given sheet. The one or more display elements may indicate filtered information from a data set associated with the core page and/or one or more other secondary pages.

In some implementations, the user device may detect a gestural interaction in an area (or space) of a display screen that is associated with a portion of the GUI. For example, the portion of the GUI may be the core page or a sheet of the one or more sheets. The gestural interaction may indicate an action. The user device may update, based on detecting the first gestural interaction and the action, the GUI to cause other portions (e.g., all other portions), from the core page and the one or more sheets, of the GUI to display updated information in accordance with the action. For example, the user device may update display elements included in a given sheet, may re-filter information indicated by a display element, and/or may add (or remove) a display element from a sheet and/or the core page, among other examples.

In some implementations, the user device may detect an action associated with a secondary page. For example, the user may navigate (e.g., via gestural navigation) to a secondary page of the GUI via interacting with a sheet (displayed on the core page of the GUI) that corresponds to the secondary page. The action may be associated with an interaction or input on the secondary page. When navigating back to the core page, the user device may cause display elements for other secondary pages to be updated based on, or in accordance with, the action. For example, information in a data set may be modified based on the action associated with the secondary page. The modified information may impact or change content associated with another secondary page. By updating the display elements for the sheet associated with the other secondary page, the updated content or information may be indicated via the sheet (e.g., without the user navigating to the other secondary page).

As a result, the GUI described herein enables a user to view or access content associated with multiple pages of the GUI while also enabling quick access to the content via gestural navigation. For example, the GUI enables content or information to be displayed on a core page corresponding to multiple secondary pages (e.g., via the display elements of respective sheets displayed on the core page). Further, the GUI enables a user to view updated or changed information associated with multiple pages from a single view (e.g., without having to navigate to the secondary page) in real time. The GUI described herein conserves processing resources, memory resources, and/or network resources, among other examples, by reducing an amount of navigation to different pages required to identify and/or view relevant content. Furthermore, the GUI described herein makes data easier to access by enhancing a user interface, thereby improving a user experience, enhancing user-friendliness of a user device and the GUI, and improving the ability of a user to access information (e.g., by enabling the user to view content of a secondary page and to quickly navigate to the secondary page via gestural navigation). For example, content of an application (e.g., that includes multiple pages) may be presented in a unified manner in a single page (e.g., the core page). Additionally, updated or modified content of the application may be presented in a unified manner for multiple pages (e.g., via updated display elements of respective sheets) of the GUI in the single page. In other words, the user may quickly locate informational content of interest without navigating away from the home page and without following numerous links from the home page. In this way, computing resources and/or network resources may be conserved by reducing an amount of navigation performed by the user.

FIGS. 1A-1D are diagrams of an example 100 associated with gestural navigation of a GUI. As shown in FIGS.

1A-1D, example 100 includes a user device and a server device. These devices are described in more detail in connection with FIGS. 2 and 3.

As shown in FIG. 1A, and by reference number 105, the server device may transmit, and the user device may receive, information associated with a GUI. The GUI may be associated with an application executing on the user device. As another example, the GUI may be associated with a website or a web page. In some implementations, the GUI may be associated with a website being displayed via a web browser that is executing on the user device.

In some implementations, the server device may transmit, and the user device may receive, one or more data sets. The one or more data sets may include information to be displayed via the GUI. In some implementations, the one or more data sets may be associated with an account. For example, the user device may obtain (e.g., via a user input) account information identifying the account. The one or more data sets provided to the user device may be specific to the account. The one or more data sets may be associated with a core page (e.g., a main page or a home page) of the GUI. Additionally, or alternatively, the one or more data sets may be associated with a secondary page of the GUI. As used herein, "secondary page" may refer to a page of the GUI that is accessible via navigation within the GUI. For example, "core page" may refer to a page that is displayed for the GUI without requiring navigation by a user (e.g., a home page, a main page, or a default page), such as in response to a user logging in to an application associated with the GUI.

In some implementations, the server device may transmit, and the user device may receive, display information associated with the GUI. The display information may include information that enables, or instructs, the user device to display the GUI. For example, the display information may include code that indicates information to enable the user device to display the GUI. A language or framework associated with the code may be Java (e.g., JavaScript), C (or C #), Swift, hypertext markup language (HTML), and/or cascading style sheets (CSS), among other examples. In some implementations, the display information may include one or more documents used to generate the GUI. For example, the display information may include a document object model (DOM) or an HTML document, among other examples.

As shown by reference number 110, the user device may provide, for display, the GUI. The user device may display the GUI via a display screen (e.g., a touch screen) of the user device. For example, the user device may display the GUI based on, or in response to, receiving the information from the server device. Additionally, or alternatively, the user device may display the GUI based on detecting a user input. For example, the user input may include a log-in input (e.g., to an application associated with the GUI). As another example, the user input may include an address (e.g., a uniform resource locator (URL) address) associated with the GUI.

As shown in FIG. 1A, the GUI may include a core page. The core page may display core or fundamental information associated with the GUI (e.g., associated with an application or a website associated with the GUI). As an example, FIG. 1A shows the core page displaying account information. For example, an application associated with the GUI may be associated with accessing account information for an account of the user (e.g., one or more financial accounts, such as bank accounts or credit card accounts). As shown in FIG. 1A, the core page may include one or more display elements associated with displaying account information. For example, a first display element may display information associated with a first account (e.g., account 1 showing an amount due of $375.00) and a second display element may display information associated with a second account (e.g., account 2 showing a balance of $4,000). In other examples, the core page may display different types of information, depending on a type of application or web page associated with the GUI (e.g., for a GUI of an application associated with a security system, the core page may include one or more display elements associated with indicating a status of the security system).

Additionally, the GUI may include one or more sheets. The one or more sheets may also be referred to as layers or spaces. The one or more sheets may correspond to respective secondary pages of the GUI. The secondary page(s) may be associated with content pages of the application or web page associated with the GUI. For example, a secondary page may be associated with a particular type of content or action associated with the application or the web page. The one or more sheets may include respective subsets of display elements from respective sets of display elements associated with the respective secondary pages. In other words, a given secondary page may be associated with a set of one or more display elements. A sheet corresponding to the given secondary page (e.g., the sheet being displayed with the core page) may include a subset of one or more display elements from the set of one or more display elements. Therefore, each sheet may include information or content that is displayed via the secondary page (e.g., enabling the user to view actual content from the secondary page when viewing the core page).

In some implementations, the core page may be associated with a first layer of the GUI, and the one or more sheets may be associated with a second layer of the GUI. "Layer" may refer to a discrete level or element within a visual hierarchy of the GUI. The different layers may be used to organize and structure the various components of the GUI. For example, the different layers may visually place the core page in a background layer of the GUI and the one or more sheets in a foreground layer of the GUI (or the core page in the foreground layer and the one or more sheets in the background layer). By separating the core page and the one or more sheets of the GUI into distinct layers, the appearance and behavior associated with the GUI can be more easily managed and/or manipulated. Additionally, the distinct layers create a more engaging and interactive user experience. In some implementations, the different layers may be indicated by a layer index value (sometimes referred to as a z-index). The layer index value may indicate a relative position of one layer in relation to one or more other layers (e.g., a layer with a higher layer index value may appear "in front of" layers with lower layer index values).

As shown in FIG. 1A as an example, the GUI includes a first sheet and a second sheet. Each sheet may be associated with a secondary page (e.g., that is associated with specific content or information for the application). For example, the first sheet may be associated with a rewards page (e.g., a secondary page associated with displaying content for rewards associated with the one or more accounts). The second sheet may be associated with an activity page (e.g., a secondary page associated with displaying content indicating specific activity that has occurred in connection with the one or more accounts). Therefore, in the example shown in FIG. 1A, the core page may provide an overview of the one or more accounts and the one or more sheets may indicate information for secondary pages associated with the one or more accounts (e.g., the one or more sheets may indicate rewards information and activity information that is pulled from respective secondary pages of the GUI).

For example, the one or more display elements of a given sheet may display filtered information from a data set. For example, the data set may be associated with the core page or a secondary page. The data set may be a data set indicated or provided by the server device and/or a data set stored by the user device. For example, the user device may apply a filter to the data set to obtain information to be displayed via the one or more display elements of the given sheet. The filter may be associated with, or based on, the content to be displayed via the secondary page associated with the given sheet. For example, the filter may enable the user device to isolate information, from the data set, that is relevant to the secondary page. From the isolated information, the user device may identify information to be displayed via the one or more display elements (e.g., based on a type of information associated with the one or more display elements).

For example, the first page may include a display element associated with indicating a total number of reward points (e.g., shown as a balance in FIG. 1A). The user device may filter a data set to identify rewards data associated with the one or more accounts (e.g., the one or more accounts for which information is currently being displayed on the core page). As shown in FIG. 1A, the filtered information may indicate that the one or more accounts may have a rewards point balance of 7,289. The filter(s) may be based on content or information being displayed via the core page and/or via another sheet. This enables the user device to identify and/or display more relevant information. As an example, the user device may detect a gestural interaction that indicates a selection of a given account (e.g., from the account 1 or the account 2). The user device may modify or update the GUI to cause information associated with the account 1 to be displayed via the core page. Additionally, the user device may update information being displayed via the one or sheets by updating one or more filters so that only information associated with the given account is displayed via the one or more sheets (e.g., rather than information associated with the account 1 and the account 2).

In other words, the one or more display elements of the one or more sheets may be dynamic display elements. The display elements may be "dynamic" in that the display elements may update or change information or content being displayed based on interactions or actions performed via other portions or other pages of the GUI. For example, the dynamic display elements may dynamically display updated information based on an action indicating modified information for a data set. For example, the user device may update or modify one or more filters (e.g., dynamically in response to the action) being used to identify the information to be displayed via the dynamic display elements. In this way, relevant information in real time may be displayed for secondary pages (e.g., via the one or more sheets) without the user navigating to the secondary pages. The one or more sheets may display updated information in response to updates or changes made elsewhere in the GUI. This reduces an amount of navigation to be performed via the GUI to identify changes or updates for content in each secondary page that are made based on updates or changes made elsewhere in the GUI.

The one or more sheets may be displayed at respective edges of a display screen of the user device. For example, each sheet may be displayed at an edge of the display screen. Placing a sheet at an edge of the display screen may provide an indication, of a user of the gestural interaction, associated with navigating to a secondary page associated with the sheet. For example, a gestural interaction in a direction toward the edge may be associated with navigating to the secondary page. As shown in FIG. 1A, the first sheet may be located at a top edge of the display screen and the second sheet may be located at a bottom edge of the display screen. The arrangement shown in FIG. 1A is an example. In other implementations, the first sheet may be located at a right edge of the display screen and the second sheet may be located at a left edge of the display screen. In some implementations, an arrangement or placement of the one or more sheets may be based on a size or orientation (e.g., an aspect ratio) of the display screen. For example, if the display screen has a first orientation or a first size, then the one or more sheets may be displayed in a first arrangement. If the display screen has a second orientation or a second size, then the one or more sheets may be displayed in a second arrangement. As an example, if the display screen has a first ratio of width to height (e.g., an aspect ratio of 16:9), then the one or more sheets may be displayed at the top and bottom edges of the display screen (e.g., because the display screen is taller and this arrangement provides easier access to the core page). If the display screen has a second ratio of width to height (e.g., an aspect ratio of 4:3), then the one or more sheets may be displayed at the right and left edges of the display screen (e.g., because the display screen is wider and this arrangement provides easier access to the core page).

Figure 1B:
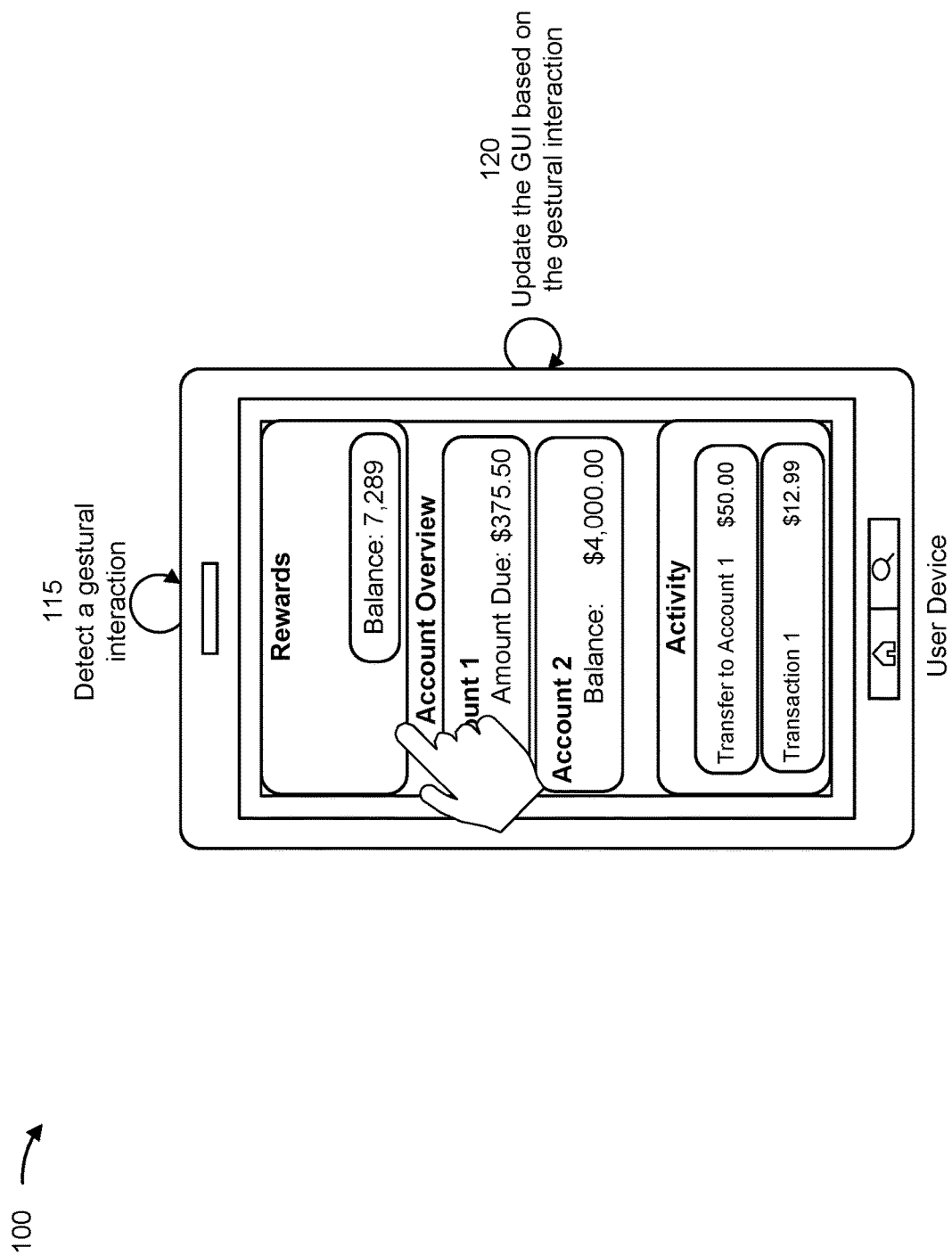

As shown in FIG. 1B, and by reference number 115, the user device may detect a gestural interaction associated with the GUI. For example, the user may provide a gestural input to the GUI (e.g., a swipe, a tap, a pinch, or another gestural input) in an area of the GUI. The area may correspond to a portion of the GUI. The portion may be a sheet or the core page. For example, the gestural interaction may be proximate to an edge of the display screen. Therefore, the user device may detect that the gestural interaction is associated with a sheet located at, or near, the edge. As another example, the gestural interaction may be a tap in a center of the display screen. In such examples, the user may detect that the gestural interaction is associated with the core page.

In some implementations, the gestural interaction may indicate an action. For example, a swipe near an edge of the display screen may indicate an action of opening a secondary page associated with a sheet that is located at, or near, the edge. As another example, tapping a display element (e.g., of a sheet or the core page) may indicate an action of displaying more detailed information and/or other display elements associated with the display element. As another example, a tap or a pinch in an area of the GUI near the core page may indicate an action of displaying additional information associated with the core page. As another example, a tap or a pinch in an area of the GUI near a display element of the core page (e.g., associated with an account) may indicate an action of filtering information for the core page and the one or more sheets to display only information associated with the display element. The above actions are provided as examples, and other actions may be indicated via the gestural interaction with the GUI.

As shown by reference number 120, the user device may update the GUI based on the gestural interaction. In some implementations, the user device may update the GUI based on the action indicated by the gestural interaction. In some implementations, updating the GUI may include updating code associated with displaying the GUI. Additionally, or alternatively, updating the GUI may include updating one or more filters used to display information via the display element(s) of the one or more sheets. Additionally, or alternatively, updating the GUI may include modifying, adding, or removing information from a data set associated with the GUI.

Figure 1C:
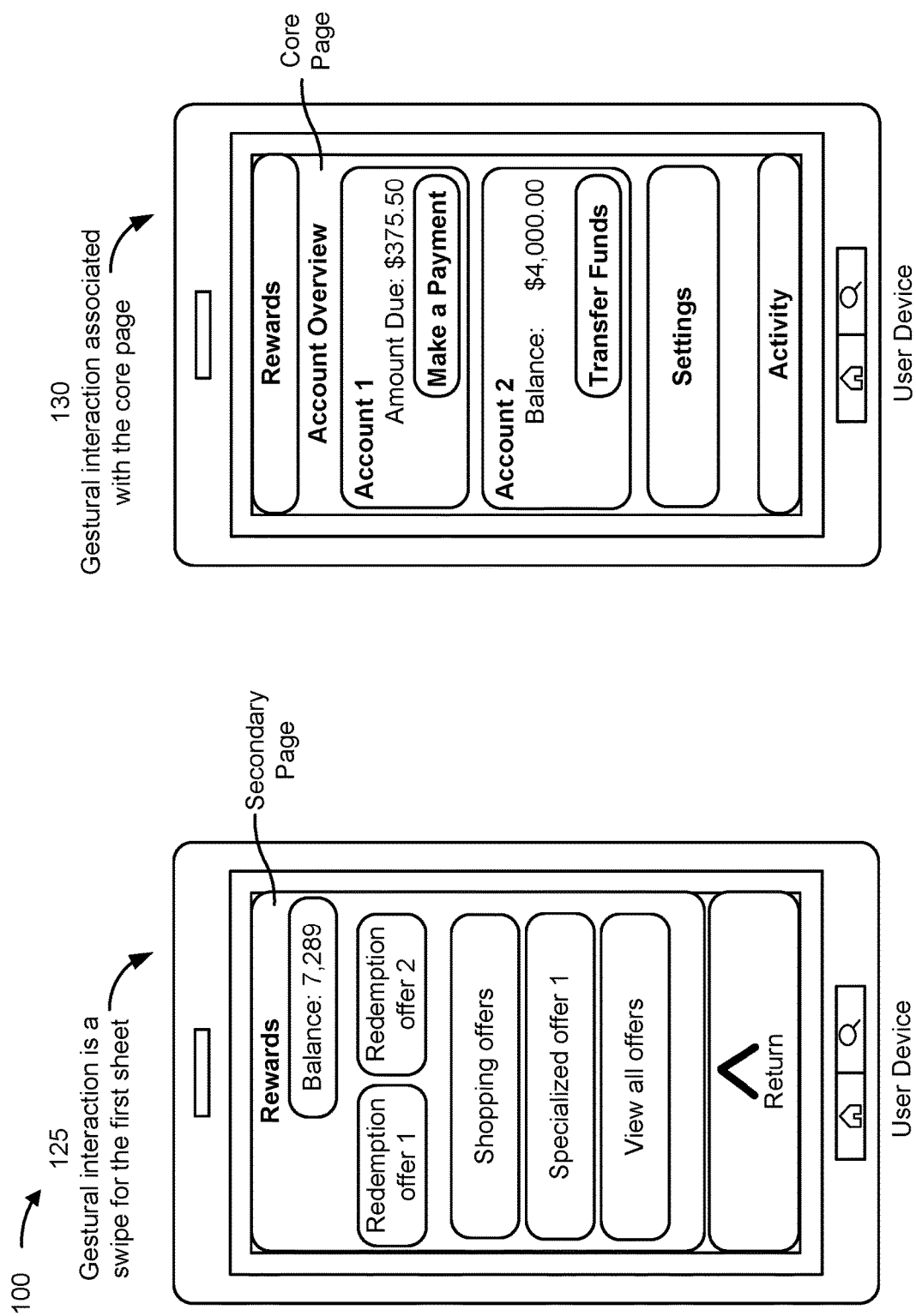

FIG. 1C shows two examples of updating the GUI in response to the detected gestural interaction and/or the action. For example, as shown by reference number 125, the gestural interaction may be a swipe for the first sheet (e.g., associated with the rewards page). For example, the gestural interaction may indicate a swipe in a direction associated with the first sheet (e.g., a swipe down starting near the top edge of the display screen). This may indicate that the action is to open the secondary page associated with the first sheet (e.g., the rewards page).

The user device may cause, based on (or in response to) the first gestural interaction indicating the swipe in the direction associated with the first sheet, the secondary page (e.g., the rewards page) associated with the first sheet to be displayed. For example, the first sheet may include one or more display elements associated with the secondary page (e.g., the rewards point balance display element). The secondary page may include a set of one or more display elements including the one or more display elements.

For example, displaying the secondary page may cause an amount or level of information associated with the secondary page to be expanded. As an example, the secondary page may include one or more display elements associated with redemption offers for rewards points (e.g., shown as "Redemption offer 1" and "Redemption offer 2" in FIG. 1C). As another example, the secondary page may include a shopping offer display element, a specialized offer display element (e.g., a display element that displays information that is particular to the account associated with the user), and/or a display element associated with viewing additional offers that links to another secondary page (e.g., shown as "View all offers" in FIG. 1C), among other examples. Additionally, the secondary page may include a display element associated with returning to the core page of the GUI (e.g., show as "Return" in FIG. 1C). For example, if the user device detects a gestural interaction associated with the return display element (e.g., a swipe up in an area of the GUI associated with the return display element), then the user device may cause the core page to be displayed, as described in more detail elsewhere herein.

As another example, as shown by reference number 130, the gestural interaction may be associated with the core page. For example, the portion of the GUI in which the user inputs or provides the gestural interaction may be the core page. As an example, the gestural interaction may be a pinch out in the portion of the GUI associated with the core page. The gestural interaction may indicate that the action is to display the core page or to expand the core page.

The core page may be associated with a set of one or more display elements. When the GUI displays the core page and the one or more sheets, the GUI may display a subset of one or more display elements from the set of one or more display elements associated with the core page. For example, as shown in FIGS. 1A and 1B, the subset of one or more display elements may include a first display element associated with a first account (e.g., "Account 1") and a second display element associated with a second account (e.g., "Account 2").

The gestural interaction associated with the core page may indicate that the action is to display the core page or to expand the core page. As shown in FIG. 1C, based on (or in response to) detecting the gestural interaction associated with the core page, the user device may cause the core page to be expanded to display the set of one or more display elements. For example, the set of one or more display elements may include a payment display element (e.g., shown as "Make a Payment" in FIG. 1C), a transfer display element (e.g., shown as "Transfer Funds" in FIG. 1C), and a settings display element (shown as "Settings" in FIG. 1C), among other examples (e.g., in addition to the first display element associated with the first account and the second display element associated with the second account). For example, the newly displayed display elements may enable the user to perform additional actions (e.g., make a payment toward a balance of an account, transfer funds from an account, and/or view account settings), and/or view additional information or content.

Additionally, the user device may cause, based on the action indicating that the core page is to be displayed, display sizes, of respective sheets of the one or more sheets, to be reduced. For example, when the core page is expanded to display the set of one or more display elements, the user device may reduce a display size (e.g., a quantity of pixels or a relative size compared to other elements of the GUI) of each sheet of the one or more sheets. For example, as shown in FIG. 1C, the one or more sheets may be reduced in size to display only an indication of the name or description of the secondary page associated with the one or more sheets (e.g., "Rewards" and "Activity" as shown in FIG. 1C). This enables the GUI to display additional display elements and/or information when the core page is expanded.

As another example, the gestural interaction may be associated with a display element (e.g., included in the core page or a sheet). For example, the display element may be a selectable display element (e.g., a display element that can be selected by a user). The gestural interaction may indicate that the action is a selection of the display element. For example, the gestural interaction may be a tap in the portion of the GUI associated with the display element. The user device may cause, based on (or in response to) the action indicating the selection of the display element, a page or sheet of the GUI to be modified. For example, if the display element is included in the core page, then the user device may cause the core page to be modified in accordance with an action associated with a selection of the display element. As another example, if the display element is included in a sheet, then the user device may cause the sheet to be modified in accordance with the action associated with the selection of the display element. For example, the display element may be included in a sheet and may be associated with presenting additional actions that can be performed via the GUI (e.g., additional actions associated with a content or category of the secondary page associated with the sheet). The user device may cause, based on (or in response to) the action indicating the selection of the display element, one or more display elements to be added to the sheet (e.g., where the one or more display elements are associated with respective actions from the additional actions that can be performed via the GUI). Additionally, the user device may cause one or more display elements that were previously displayed via the sheet to be removed or hidden (e.g., to enable the added display elements to be viewed by the user).

Figure 1D:
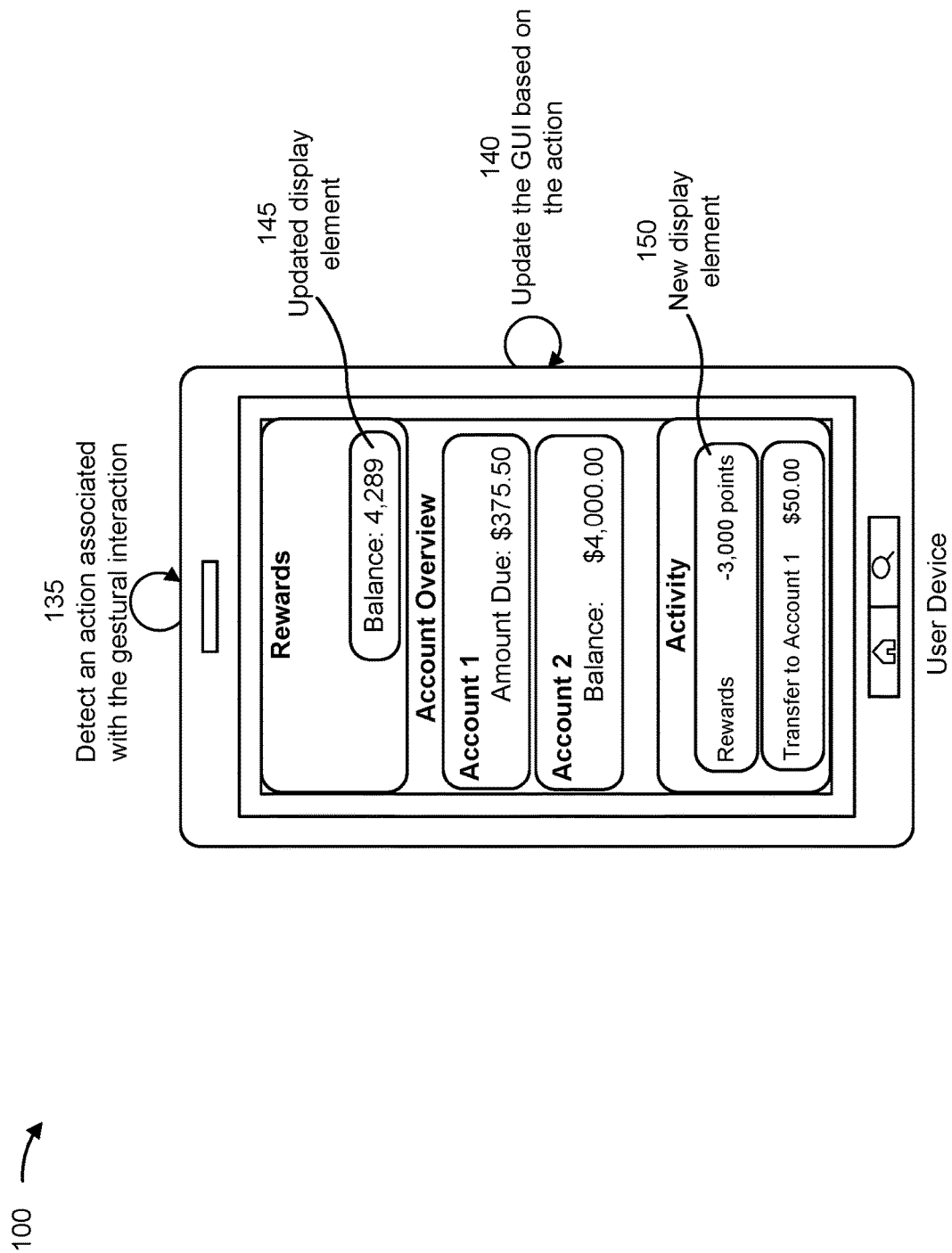

As shown in FIG. 1D, and by reference number 135, the user device may detect an action associated with a gestural interaction. For example, the action may include the action(s) described above. As another example, the action may include a modification of information associated with an account or a data set that is associated with the GUI and/or the user device. As another example, the action may include a selection of a display element that is associated with causing a modification of information associated with the account or the data set and/or causing a modification of the GUI. As another example, the action may include an input (e.g., a user input) of information to be added to the data set. As shown by reference number 140, the user device may update the GUI based on (or in response to) the action indicated by the gestural interaction.

For example, the user device may update information indicated by a display element based on (or in response to) the action indicating new information or modified information for the data set. As shown by reference number 145, the user device may display an updated display element (e.g., where the updated display element includes updated information). For example, the user device may detect that a redemption of rewards points has occurred (e.g., based on a gestural interaction or a user input associated with a secondary page associated with rewards, such as the secondary page depicted in FIG. 1C and reference number 125). The redemption of the rewards points may modify a quantity of rewards points associated with the one or more accounts. For example, one or more entries in the data set associated with the one or more accounts may be modified to indicate the quantity of rewards points. Based on filtering the data set for the display element(s) associated with the first sheet, the user device may identify the quantity of rewards points (e.g., from the one or more entries) and may display an updated rewards point balance via the first sheet. For example, the redemption of the rewards points may be associated with redeeming 3,000 rewards points. Therefore, the user device may cause a display element associated with the first sheet to indicate the new rewards point balance of 4,289 (e.g., reduced by 3,000 rewards points).

For example, the user device may detect a user input, associated with a secondary page, indicating updated information for a data set associated with the GUI (e.g., modifying a quantity of rewards points associated with one or more accounts). The user device may update a display element associated with the core page and/or the one or more sheets to indicate the updated information. For example, the user device may modify information displayed via a display element of the core page to indicate the modified quantity of rewards points associated with one or more accounts. As another example, the user device may modify information displayed via a display element of a sheet associated with another secondary page (e.g., the second sheet and the activity page) to indicate the modified quantity of rewards points associated with one or more accounts. This enables the GUI to display relevant information from a secondary page or the core page based on a selection in a different portion of the GUI (e.g., a different secondary page) without the user navigating to the secondary page or expanding the core page, thereby reducing an amount of navigation associated with viewing relevant information.

As another example, the action may be associated with a selection of a given account indicated by the core page (e.g., account 1). The total balance of rewards points (e.g., 7,289 as shown in FIGS. 1A and 1B) may be associated with both the account 1 and the account 2 (e.g., where the account 1 is associated with 4,289 rewards points and the account 2 is associated with 3,000 rewards points). In response to the action indicating the selection of the given account (e.g., the account 1), the user device may cause a filter for the display element of the first sheet to be updated. For example, the filter may be updated to isolate only information associated with the selected account. Therefore, the updated display element in the first sheet (e.g., the rewards point balance) may display information that is associated with the selected account (e.g., the account 1). This enables the first sheet to display relevant information from a secondary page (e.g., the rewards page) based on a selection in a different portion of the GUI without the user navigating to the secondary page, thereby reducing an amount of navigation associated with viewing relevant information.

For example, the user device may detect a gestural interaction associated with a secondary page that indicates modified information or new information associated with the data set (e.g., modifying or redeeming rewards points). The user device may detect a gestural interaction that indicates a return to displaying the core page and the one or more sheets. The user device may cause information indicated by display elements associated with the core page and/or another sheet of the one or more sheets to be updated based on the modified information or the new information, as described in more detail elsewhere herein.

In some implementations, the user device may update the GUI by adding a new display element to a sheet or the core page. For example, as shown by reference number 150, the user device may add a new display element to a sheet of the one or more sheets (e.g., the second sheet as shown in FIG. 1D). For example, the user device may add a new display element to a subset of one or more display elements displayed via the sheet based on (or in response to) the action indicating new information or modified information for a data set. For example, as shown in FIG. 1D, the new display element may indicate new activity (e.g., a rewards point redemption) associated with the one or more accounts. This enables the user to view new information that is added for a secondary page (e.g., the activity page) via the sheet (e.g., the second sheet) without navigating to the secondary page. Further, this enables the user to be notified of changes to information or content associated with the secondary page (e.g., by indicating actual changed or modified information, rather than just an indication that a modification has occurred), enabling the user to view relevant information when determining whether the changes to information or content associated with the secondary page need to be investigated or viewed in more detail. For example, if the second sheet were to simply display a notification that a change has occurred in the secondary page, then the user may still need to navigate to the secondary page to view or investigate the change. By the user device displaying actual information indicating the change (e.g., a new display element indicating new information associated with the secondary page), the user may view the information associated with the change and make an improved determination of whether to navigate to the secondary page to view or investigate the change.

As indicated above, FIGS. 1A-1D are provided as an example. Other examples may differ from what is described with regard to FIGS. 1A-1D.

Figure 2:
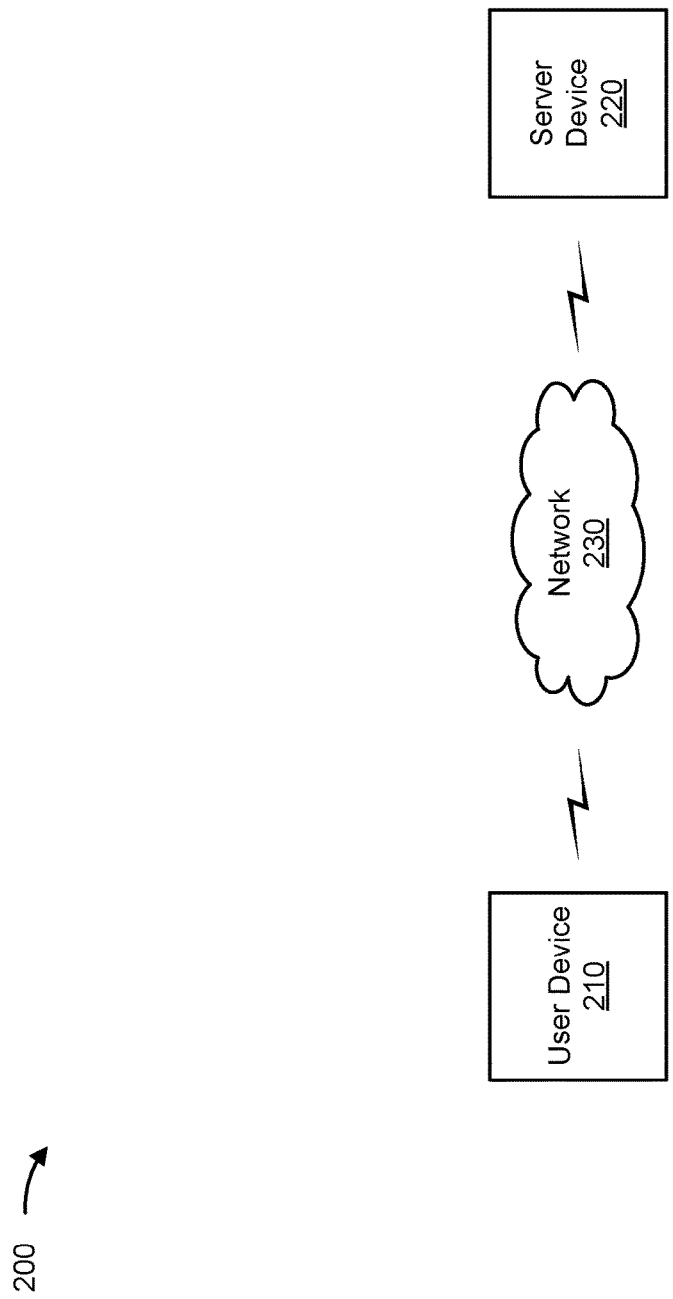
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 210, a server device 220, and a network 230. Devices of environment 200 may interconnect via wired connections, wireless connections, or a combination of wired and wireless connections.

The user device 210 may include one or more devices capable of receiving, generating, storing, processing, and/or providing information associated with gestural navigation of a GUI, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The server device 220 may include one or more devices capable of receiving, generating, storing, processing, providing, and/or routing information associated with gestural navigation of a GUI, as described elsewhere herein. The server device 220 may include a communication device and/or a computing device. For example, the server device 220 may include a server, such as an application server, a client server, a web server, a database server, a host server, a proxy server, a virtual server (e.g., executing on computing hardware), or a server in a cloud computing system. In some implementations, the server device 220 may include computing hardware used in a cloud computing environment.

The network 230 may include one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
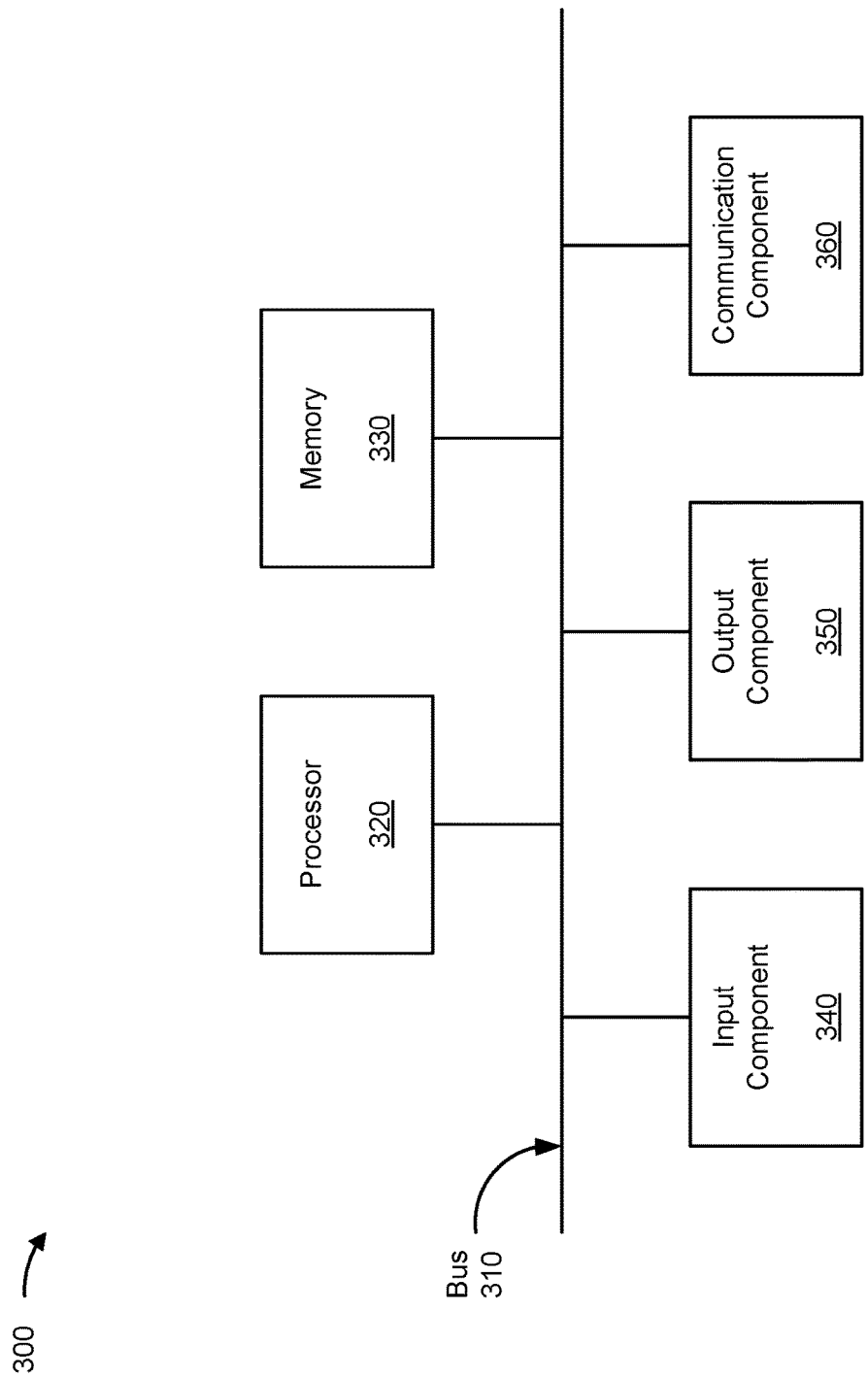
FIG. 3 is a diagram of example components of a device associated with gestural navigation of a GUI, in accordance with some embodiments of the present disclosure.

FIG. 3 is a diagram of example components of a device 300 associated with gestural navigation of a GUI. The device 300 may correspond to the user device 210 and/or the server device 220. In some implementations, the user device 210 and/or the server device 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
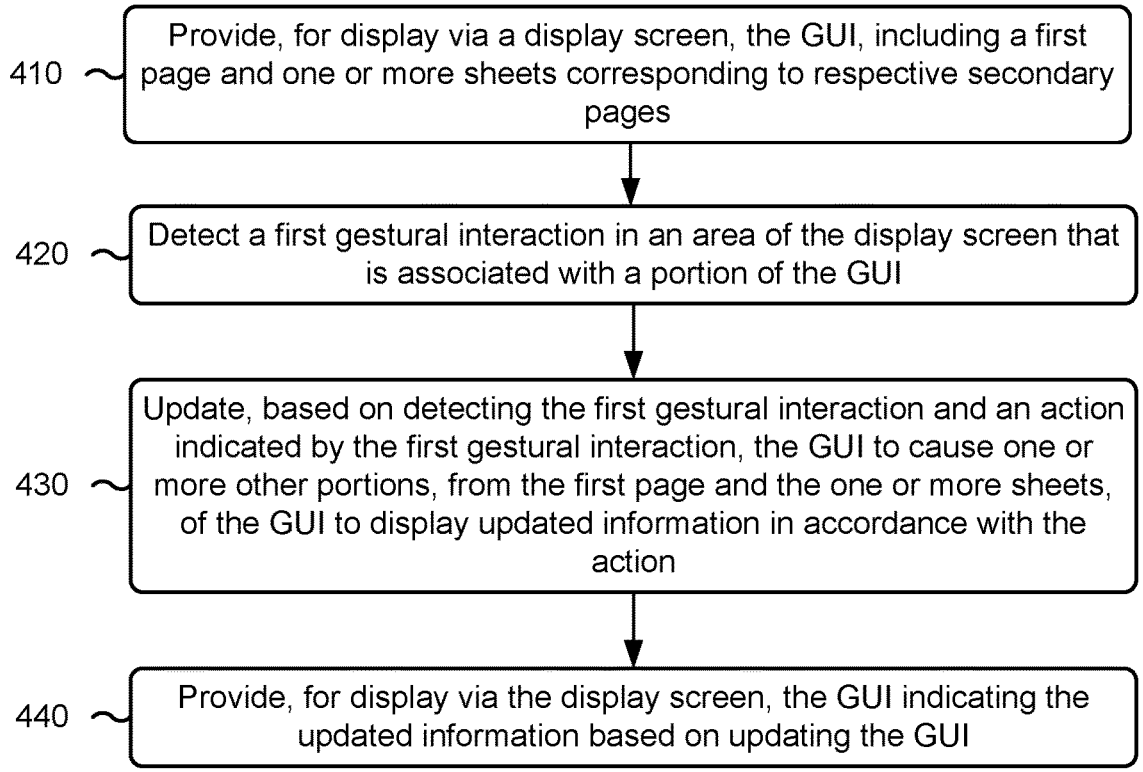
FIG. 4 is a flowchart of an example process associated with gestural navigation of a GUI, in accordance with some embodiments of the present disclosure.

FIG. 4 is a flowchart of an example process 400 associated with gestural navigation of a GUI. In some implementations, one or more process blocks of FIG. 4 may be performed by the user device 210. In some implementations, one or more process blocks of FIG. 4 may be performed by another device or a group of devices separate from or including the user device 210, such as the server device 220. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include providing, for display via a display screen, the GUI, including a first page and one or more sheets corresponding to respective secondary pages (block 410). For example, the user device 210 (e.g., using processor 320 and/or memory 330) may provide, for display via a display screen, the GUI, including a first page and one or more sheets corresponding to respective secondary pages, as described above in connection with reference number 110 of FIG. 1A. In some implementations, the one or more sheets include respective sets of one or more dynamic display elements from respective sets of display elements associated with the respective secondary pages. In some implementations, the first page is displayed in a first layer of the GUI and the one or more sheets are displayed in a second layer of the GUI. As an example, the user device may display a GUI associated with an application that includes a core page (e.g., a home page or a main page) and one or more secondary pages.

As further shown in FIG. 4, process 400 may include detecting a first gestural interaction in an area of the display screen that is associated with a portion of the GUI (block 420). For example, the user device 210 (e.g., using processor 320 and/or memory 330) may detect a first gestural interaction in an area of the display screen that is associated with a portion of the GUI, as described above in connection with reference number 115 of FIG. 1B and/or reference number 135 of FIG. 1D. In some implementations, the portion of the GUI is the first page or a sheet from the one or more sheets. In some implementations, the first gestural interaction indicates an action. As an example, a user may interact with the display screen to input the first gestural interaction. The action may include modifying or adding information associated with the data set.

As further shown in FIG. 4, process 400 may include updating, based on detecting the first gestural interaction and the action, the GUI to cause one or more other portions, from the first page and the one or more sheets, of the GUI to display updated information in accordance with the action (block 430). For example, the user device 210 (e.g., using processor 320 and/or memory 330) may update, based on detecting the first gestural interaction and the action, the GUI to cause one or more other portions, from the first page and the one or more sheets, of the GUI to display updated information in accordance with the action, as described above in connection with reference number 120 of FIG. 1B and/or reference number 140 of FIG. 1D. As an example, the user device may modify information displayed by relevant display elements from other portions of the GUI to indicate the updated information in accordance with the action. As another example, the user device may cause a new display element to be added to another sheet and/or the core page to indicate the updated information in accordance with the action.

As further shown in FIG. 4, process 400 may include providing, for display via the display screen, the GUI indicating the updated information based on updating the GUI (block 440). For example, the user device 210 (e.g., using processor 320 and/or memory 330) may provide, for display via the display screen, the GUI indicating the updated information based on updating the GUI, as described above in connection with FIGS. 1C and 1D. As an example, the user device may cause the updated GUI to be displayed via the display screen.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for gestural navigation of a graphical user interface (GUI), the system comprising:
   one or more memories; and
   one or more processors, communicatively coupled to the one or more memories, configured to:
      provide, for display via a display screen, the GUI, wherein the GUI includes a core page and one or more sheets corresponding to respective secondary pages, wherein the one or more sheets include respective subsets of display elements from respective sets of display elements associated with the respective secondary pages, and wherein the respective subsets of display elements display filtered information from a data set associated with at least one of the core page or the respective secondary pages;
      detect a first gestural interaction in an area of the display screen that is associated with a portion of the GUI, wherein the portion of the GUI is the core page or a sheet from the one or more sheets, and wherein the first gestural interaction indicates an action associated with the GUI;
      update, based on detecting the first gestural interaction and the action, the GUI to cause all other portions, from the core page and the one or more sheets, of the GUI to display updated information in accordance with the action; and
      provide, for display via the display screen, the GUI indicating the updated information based on updating the GUI.

2. The system of claim 1, wherein the one or more sheets are layers of the GUI.

3. The system of claim 1, wherein the sheet includes a subset of display elements from a set of display elements of a secondary page associated with the sheet, wherein the portion of the GUI is the core page or another sheet of the one or more sheets, and wherein the one or more processors, to update the GUI, are configured to:
   update information indicated by a display element from the subset of display elements based on the action indicating new information or modified information for the data set.

4. The system of claim 1, wherein the sheet includes a subset of display elements from a set of display elements of a secondary page associated with the sheet, wherein the portion of the GUI is the core page or another sheet of the one or more sheets, and wherein the one or more processors, to update the GUI, are configured to:
   add a new display element to the subset of display elements based on the action indicating new information or modified information for the data set.

5. The system of claim 1, wherein the GUI displays a subset of display elements from a set of display elements of the core page, wherein the portion of the GUI is associated with the core page, and wherein the one or more processors, to update the GUI, are configured to:
   cause, based on the action indicating that the core page is to be displayed, the core page to be expanded to display the set of display elements; and
   cause, based on the action indicating that the core page is to be displayed, display sizes, of respective sheets of the one or more sheets, to be reduced.

6. The system of claim 1, wherein the portion of the GUI is associated with the sheet, and wherein the one or more processors, to update the GUI, are configured to:
   cause a secondary page associated with the sheet to be displayed.

7. The system of claim 6, wherein the one or more processors are further configured to:
   detect a second gestural interaction associated with the secondary page that indicates modified information or new information associated with the data set,
   detect a third gestural interaction that indicates a return to displaying the core page and the one or more sheets; and
   cause information indicated by display elements associated with at least one of the core page or another sheet of the one or more sheets to be updated based on the modified information or the new information.

8. The system of claim 1, wherein the one or more sheets are displayed at respective edges of the display screen.

9. The system of claim 1, wherein the core page is associated with a first layer of the GUI and the one or more sheets are associated with a second layer of the GUI.

10. A method of gestural navigation of a graphical user interface (GUI), comprising:
   providing, by a device and for display via a display screen, the GUI, wherein the GUI includes a first page and one or more sheets corresponding to respective secondary pages,
      wherein the one or more sheets include respective sets of one or more dynamic display elements from respective sets of display elements associated with the respective secondary pages, and
      wherein the first page is displayed in a first layer of the GUI and the one or more sheets are displayed in a second layer of the GUI;
   detecting, by the device, a first gestural interaction in an area of the display screen that is associated with a portion of the GUI,
      wherein the portion of the GUI is the first page or a sheet from the one or more sheets, and
      wherein the first gestural interaction indicates an action;
   updating, by the device and based on detecting the first gestural interaction and the action, the GUI to cause one or more other portions, from the first page and the one or more sheets, of the GUI to display updated information in accordance with the action; and
   providing, by the device and for display via the display screen, the GUI indicating the updated information based on updating the GUI.

11. The method of claim 10, wherein the respective sets of one or more dynamic display elements dynamically display updated information based on the action indicating modified information for a data set associated with at least one of the first page or a secondary page of the respective secondary pages.

12. The method of claim 10, wherein the respective sets of one or more dynamic display elements display filtered information from a data set associated with at least one of the first page or a secondary page of the respective secondary pages.

13. The method of claim 10, wherein the action is associated with a user input indicating new information for a data set associated with the first page, and wherein updating the GUI comprises:
   updating at least one dynamic display element, from the respective sets of one or more dynamic display elements, to cause the at least one dynamic display element to indicate the new information.

14. The method of claim 10, wherein the first gestural interaction indicates a swipe in a direction associated with the sheet, the method further comprising:
   causing, based on the first gestural interaction indicating the swipe in the direction associated with the sheet, a secondary page associated with the sheet to be displayed.

15. The method of claim 14, wherein updating the GUI comprises:
   detecting a user input, associated with the secondary page, indicating updated information for a data set associated with the GUI; and
   updating at least one of a dynamic display element, from the respective sets of one or more dynamic display elements, or a display element associated with the first page to indicate the updated information.

16. A non-transitory computer-readable medium storing a set of instructions, the set of instructions comprising:
   one or more instructions that, when executed by one or more processors of a device, cause the device to:
      provide, for display via a display screen, a graphical user interface (GUI), wherein the GUI includes a core page and one or more sheets corresponding to respective secondary pages, wherein the one or more sheets include respective subsets of display elements from respective sets of display elements associated with the respective secondary pages, and wherein the respective subsets of display elements display filtered information from a data set associated with at least one of the core page or the respective secondary pages;
      detect a first gestural interaction in an area of the display screen that is associated with a portion of the GUI, wherein the portion of the GUI is the core page or a sheet from the one or more sheets, and wherein the first gestural interaction indicates an action associated with the GUI;
      update, based on detecting the first gestural interaction and the action, the GUI to cause all other portions, from the core page and the one or more sheets, of the GUI to display updated information in accordance with the action; and
      provide, for display via the display screen, the GUI indicating the updated information based on updating the GUI.

17. The non-transitory computer-readable medium of claim 16, wherein the sheet includes a subset of display elements from a set of display elements of a secondary page associated with the sheet, wherein the portion of the GUI is the core page or another sheet of the one or more sheets, and wherein the one or more instructions, that cause the device to update the GUI, cause the device to:
   modify a display element from the subset of display elements based on the action indicating new information or modified information for the data set.

18. The non-transitory computer-readable medium of claim 16, wherein the GUI displays a subset of display elements from a set of display elements of the core page, wherein the portion of the GUI is associated with the core page, and wherein the one or more instructions, that cause the device to update the GUI, cause the device to:
   cause, based on the action indicating that the core page is to be displayed, the core page to be expanded to display the set of display elements; and
   cause, based on the action indicating that the core page is to be displayed, display sizes, of respective sheets of the one or more sheets, to be reduced.

19. The non-transitory computer-readable medium of claim 16, wherein the portion of the GUI is associated with the sheet, and wherein the one or more instructions, that cause the device to update the GUI, cause the device to:
   cause a secondary page associated with the sheet to be displayed.

20. The non-transitory computer-readable medium of claim 16, wherein the GUI is associated with an application, wherein the core page is a home page of the application, and wherein the respective secondary pages are associated with content pages of the application.

\* \* \* \* \*